C. A. HENRY.
ADJUSTABLE METALLIC FRAME FOR SCREENS AND THE LIKE.
APPLICATION FILED SEPT. 10, 1914.
Reissued Sept. 18, 1917.
14,360.
2 SHEETS—SHEET 1.
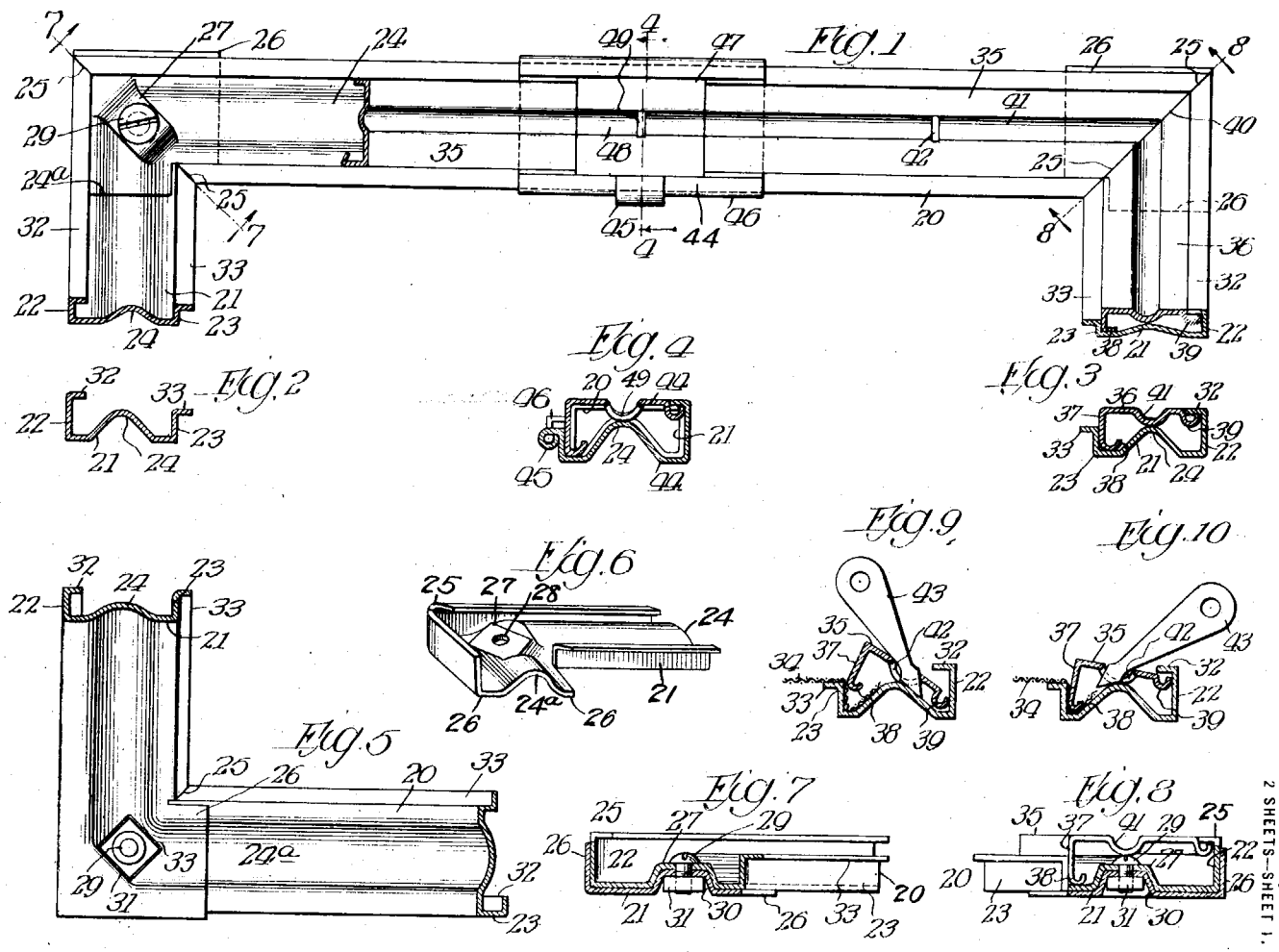
Witnesses:
A. E. Barnett
Geo. C. Parrison
Inventor:
Charles A. Henry
By Paul Carpenter
Atty.

C. A. HENRY.
ADJUSTABLE METALLIC FRAME FOR SCREENS AND THE LIKE.
APPLICATION FILED SEPT. 10, 1914.
Reissued Sept. 18, 1917.
14,360.
2 SHEETS—SHEET 2.
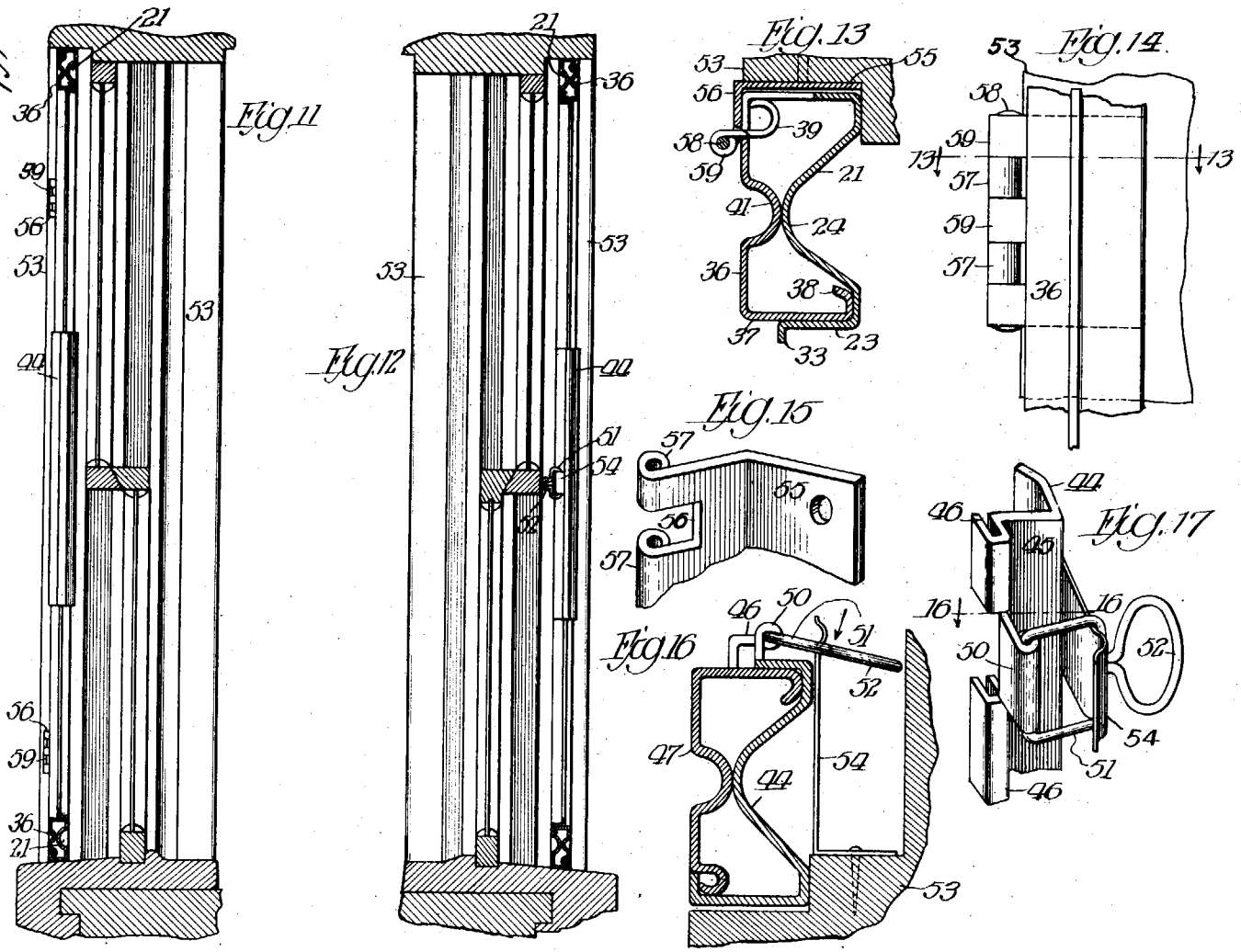
Witnesses:
S. E. Barrett
Geo. C. Dorion
Inventor.
Charles A. Henry
By Pauw Carpenter, Attys.

UNITED STATES PATENT OFFICE.

CHARLES A. HENRY, OF CHICAGO, ILLINOIS, ASSIGNOR, BY MESNE ASSIGNMENTS, TO C. K. ANDERSON, OF CHICAGO, ILLINOIS.

ADJUSTABLE METALLIC FRAME FOR SCREENS AND THE LIKE.

14,360. Specification of Reissued Letters Patent. Reissued Sept. 18, 1917.

Original No. 1,038,367, dated September 10, 1912. Serial No. 622,861, filed April 24, 1911. Application for reissue filed September 10, 1914. Serial No. 861,149.

*To all whom it may concern:*

Be it known that I, CHARLES A. HENRY, a citizen of the United States, residing at Chicago, in the county of Cook and State of Illinois, have invented certain new and useful Improvements in Adjustable Metallic Frames for Screens and the like, of which the following is a specification.

This invention relates to improvements in adjustable metallic frames, and while it is more particularly intended for use in such frames employed as window-screen frames, and will hereinafter be so referred to, and is so shown in the drawings, yet it is applicable for use in the frames of door screens, porches, sections of portable houses, flexible signs, and the like, and it consists in certain peculiarities of the construction, novel arrangement and operation of the various parts thereof, all of which will be first described in detail, and then specifically pointed out in the appended claims.

The principal object of the invention is to provide a frame of the above named general character, which shall be simple and inexpensive in construction, strong, rigid, durable, and efficient in operation, and so made that its parts may be carried in stock by merchants, to the end, that the necessary parts or pieces may be selected therefrom and readily assembled into a screen frame of any size to fit window and door frames and the like of different sizes.

Another object is to provide effective and simple means for securing the screen or wire cloth to the frame in such a manner that it will be made uniformly taut and so maintained, yet in case of wear or in case of the screen or cloth becoming broken, it can be readily removed and replaced by a new screen or cloth.

A further object is to provide a special construction of a metallic frame whereby the members of the corners thereof will interlock and be secured together so as to afford great strength and rigidity at said points and so that the clamping members of the frame for the wire screen will be self locking.

Still another object is to provide simple and efficient means for reversibly hinging and fastening the metallic frame to the window or other supporting frame thereof.

Other objects and advantages of the invention will be disclosed in the subjoined description and explanation.

In order to enable others skilled in the art to which the invention pertains, to make and use the same, I will now proceed to describe it referring to the accompanying drawings, in which—

Figure 1, is an outer face view of a portion of an adjustable metallic frame embodying the invention, illustrating the means for adjustably connecting two of the corners of the frame together, but showing portions of the outer clamping members removed or omitted from parts of the inner clamping members of the frame, Fig. 2, is a cross sectional view of one of the inner clamping members, Fig. 3, is a similar view of one of the inner and outer clamping members showing them secured together and in position for holding the wire screen or cloth in place therebetween, Fig. 4, is a cross sectional view taken on line 4—4, of Fig. 1, looking in the direction indicated by the arrows, Fig. 5, is a face view of the opposite surface of a portion of the frame at one corner thereof from that shown in Fig. 1, Fig. 6, is a perspective view of one of the corner pieces of the inner clamping members of the frame, Fig. 7, is a sectional view taken on line 7—7, of Fig. 1 looking in the direction indicated by the arrows, Fig. 8, is a similar view partly in elevation taken on line 8—8, of Fig. 1, looking in the direction indicated by the arrows, Fig. 9, is a cross sectional view of the clamping members showing them in the act of being fastened together so as to clamp the screen wire therebetween, Fig. 10, is a similar view of like parts showing them in the act of being disconnected by means of a prying instrument, Fig. 11, is a vertical view partly in section and partly in elevation of a window frame showing the adjustable metallic frame hinged to one of the sides thereof, Fig. 12, is a similar view of the opposite side of the window frame showing the means for fastening the screen frame at its side opposite that on which the hinges are located, Fig. 13, is an enlarged sectional view of a pair of the clamping members of the frame taken on line 13—13, of Fig. 14, looking in the direction indicated by the arrows, and showing the means for hinging the metallic frame to the window frame, Fig. 14, is a view in side elevation of a portion of the metallic frame and a part of the window frame showing the former hinged to the latter, Fig. 15, is a detached perspective view of a portion of one of the hinge plates, Fig. 16, is an enlarged sectional view taken on line 16—16, of Figs. 12, and 17, looking in the direction indicated by the arrows, and Fig. 17, is a detached perspective view looking in the direction indicated by the arrow in Fig. 16, of the fastening device for the metallic frame, and a portion of one of the splicing members therefor.

In referring to the drawings, like numerals of reference will be used to indicate the corresponding parts throughout the different views, and in describing the frame, it will be understood that the parts referred to as the inner ones, will be those which when the frame is located in place on a window casing are nearer to the sashes while the outer members or parts are those farther therefrom. As the frame when completed, is rectangular in shape and has four corners, each of substantially the same construction, it has been deemed unnecessary to show a complete frame, but enough thereof to disclose the construction of the various parts and how two of the corners of the frame are united.

Referring now to Figs. 1 to 8 inclusive, of the drawings, it will be seen that each of the corners of the frame is composed of two inner clamping members 20 and 21, the members 20, representing portions of the upper horizontal rail of the frame while the members 21, represent portions of the vertical side rails of the frame. Each of the inner clamping members 20 and 21, a pair of which form each of the corners of the inner part of the frame, is made of metal of any desired size and length and of the shape in cross section shown in Fig. 2 of the drawings, that is to say, each of said pieces is channel shaped and is provided centrally between the side walls 22 and 23, thereof, with a longitudinally extended and outwardly disposed corrugation, 24, to give additional strength thereto. The members 20 and 21, have their side walls at their meeting ends mitered as at 25, so as to form close joints, and said members have at their joint ends an extension 26, disposed at a right angle with its body portion and adapted to lie one on the other and to interlock with the outer walls 22, as well as with the inner walls 23, and the corrugated transverse portions 24, uniting said walls, and for this latter purpose the extensions 26, are also formed with corrugations 24ª, of a corresponding shape and size to the corrugations 24, on the body portions of the members 20 and 21, which form each of the corners of the frame. The surface between the walls of each of the members 20 and 21, at the juncture of the corrugations 24 and 24ª, on the body portion and extension 26, respectively of each member is flattened as at 27, and provided with an opening 28, for the reception of a screw 29, the head of which will be seated on the flattened portion 27, as is clearly shown in Figs. 1, 6, 7 and 8, of the drawings. Opposite each of the flattened surfaces 27, each of the members 20 and 21, is provided with a depression or recess 30, substantially rectangular in shape to receive a nut 31, which engages the screw 29, which screws and nuts are employed to more firmly unite the members 20 and 21, of the corners of the frame. By forming the recesses 30, in said members it is evident that the nuts will be countersunk so as not to offer any obstruction to the window or supporting frame, and besides said nuts will be held by said recesses against turning thus permitting the screws to be easily tightened or removed. When the screws are seated it is apparent that their heads will be about flush with the corrugations 24 and 24ª, on the body portions and extensions 26, respectively, of the corner members. The members 20 and 21, have on the free edge of their walls 22 and 23, transversely disposed flanges 32 and 33, respectively, which are extended in the same direction, that is inwardly from the perimeter of said walls. The flanges 33, will act as a rest for the wire cloth or screen 34, and so as to prevent it being cut by the walls 23, while the flanges 32 will co-act with the outer clamping members for holding the latter in position.

Fitted in each of the pieces 20 and 21, are outer clamping members 35 and 36, respectively, which are alike and are made of metal and preferably of the same length as the members 20 and 21, into which they are respectively fitted. As is clearly shown in Figs. 1, 3, 8, 9 and 10, of the drawings, each of the members 35 and 36, which as before stated are alike in construction, is channeled in cross section, that is to say, each of the members 35 and 36, has at one of its edges a wall 37, disposed at an angle to the body portion of its member and each of said walls has its free edge inturned as at 38, to facilitate its engagement with the wall 23, of one of the members 20 or 21, and to prevent it cutting the wire cloth 34, or screen. The other edge of each of the members 35 and 36 is provided with a rolled or looped wall 39, adapted to fit under one of the flanges 32, on the members 20 and 21, or outer clamping members. The meeting ends of the members 25 and 36, are mitered as at 40, so as to provide a close joint as will be readily understood by reference to Fig. 1, of the drawings. Each of the members 35 and 36, is provided in its body portion with a longitudinally extended and inwardly disposed corrugation 41, the inner portion of which will rest on the corrugation 24, of the inner clamping member in which said outer clamping member is located, as will be readily understood by reference to Figs. 3, 8, 9 and 10, of the drawings, thus affording a bearing on which the members 35 and 36, may rest and be rocked or tilted.

Each of the members 35 and 36, is provided with a transverse opening or slot 42, in its corrugated portion 41, for the reception of a prying instrument or spanner wrench 43, by means of which the members 35 and 36, can be forced into position or engagement with their respective inner clamping members, 20 and 21, or easily removed or disengaged therefrom, by simply inserting the point of the instrument 43, into the opening or slot of one of the members 35 and 36, when by pressing the instrument 43, in the proper direction the outer clamping members will be forced between the walls 22 and 23, of the inner clamping members, in which operation it is apparent that the screen or wire cloth 34, which is interposed between one of the flanges 33, on the inner clamping members and the inturned portion 38, of one of the walls 37, of the outer clamping members, will be stretched and firmly held in a taut position. To remove the members 35 and 36, from the inner members 20 and 21, it is only necessary to reverse the position of the instrument 43, to the position shown in Fig. 10, when by forcing the same in the proper direction, it is evident that the member 35 or 36, will be disengaged from the inner member with which it has been in engagement.

In order to adjust the metallic frame to any suitable size, a splice member 44, see Figs. 1, 4, and 17, is employed to embrace the adjacent ends of the members 20 or 21, about midway between the corners of the frame. Each of these splice members is of substantially the same shape in cross section as members 20 and 21, above described, and for this reason it is not deemed necessary to further describe its construction except to state that one of the walls 45, of each of said splice members is provided with a channeled extension 46, to receive the flanges 33, on the walls 23, of the members 20 and 21, which members are telescopically fitted in opposite ends of the splice members, and are prevented further inward movement by means of an extension member 47, which is interposed between the ends of the pieces 20 and 21, which are inserted in the splicing members. The extension members 47 are of substantially the same shape in cross section as the outer clamping members 35 and 36, and each has a longitudinal corrugation 48, provided with an opening 49, for the reception of a prying instrument used for inserting and removing said extension member in a similar manner to that in which the members 35 and 36, are inserted and removed. The extension members 47, may be of any desired length so that the metallic frame may be extended to fit the different sizes of standard window frames, and it is quite evident that a number of them can be carried in stock by merchants, so that those of the proper length may be selected therefrom. The splice members 44, may be of any suitable length so as to permit of more or less telescopic movement of the members 20 and 21, which are fitted in the ends thereof. To provide a part of a fastener for the metallic frame one of the splice members 44, may have a portion of its channeled flange 46, turned outwardly from its wall 45, and formed into a tubular socket or eye 50, as shown in Figs. 1, 4 and 17 of the drawings, in which a link 51, having a handle 52, may be loosely fitted. The splice member 44, equipped with the eye 50, and link 51, is located on that part or rail of the metallic frame opposite to the one which is hinged to the window casing 53, or supporting frame for the metallic frame which window casing or supporting frame may be of the ordinary or any preferred construction. The link 51, is adapted for engagement with a spring arm or catch 54, which is secured to the window frame 53, at a suitable point and projects horizontally and inwardly therefrom as will be readily understood by reference to Figs. 12 and 16, of the drawings. Secured to the side of the window frame opposite that on which the catch 54 is mounted, are a pair of hinge plates 55, each of which has at its outer edge an extension 56, which is disposed at an angle to the plate 55, and is provided on its free end with spaced apart eyes 57, to receive a pintle 58, used for pivotally connecting one of the outer clamping members 36, of the side rail of the metallic frame to said plate, and for this purpose the member 36, is provided with outturned eyes 59, to register with the eyes 57, of the hinge plate so that the pintle 58, may connect them together as will be readily understood by reference to Figs. 13 and 14, of the drawings.

It will be understood that when it is not desired to hinge the metallic frame in position on the supporting frame therefor, the hinge plates 55, and the eyes 59, on the members 36, may be omitted, and it is also obvious that the eye 50, and link 51, may be omitted from the splice member 44, and that the catch or arm 54, mounted on the window frame may be dispensed with.

Having thus fully described my invention, what I claim as new and desire to secure by Letters Patent is—

1. A metallic frame including in its construction a corner piece consisting of two channeled members each having its walls mitered at their meeting ends, a right-angled extension on each of said members to lie one on the other, said members having in one of their surfaces between the corners of their meeting ends an apertured recess, a screw located in said openings and a nut engaging said screw and located in the recess of one of said members.

2. A metallic frame including in its construction a corner piece consisting of two pieces each having at each of its edges a wall each provided with a flange extended in the same direction, the walls and flanges of each piece being mitered at their meeting ends, each of said members also having between its walls a longitudinally extended corrugation, a right angled extension on each of said members at their meeting ends to lie one on the other, each of said extensions having a longitudinally extended corrugation and provided on one of their surfaces between the corners of their meeting ends with an apertured recess, a screw located in said openings, a nut engaging said screw and located in the recess of one of said members, an outer member located in each of the first named pieces, and each consisting of a piece having a longitudinally extended and inwardly disposed corrugation to impinge against the first named corrugation and provided with an opening in its corrugated portion, each of said outer members also having at each of its edges a wall to fit between the walls of said inner members.

3. A metallic frame including in its construction a plurality of inner and outer clamping members connected together in pairs, each of said inner members consisting of a piece having at each of its edges a wall each provided with a flange extended in the same direction, each of said outer members consisting of a piece having at each of its edges a wall to fit between the walls of said inner members and provided between its ends with an opening, a splicing member telescopically engaging the adjacent ends of two pairs of the said inner and outer members and consisting of a piece having at each of its edges a wall one of which is provided with a channeled recess to receive one of the flanges on the said inner members, and an extension member located within the splicing member between the adjacent ends of said pairs of the inner and outer members and provided with an opening between its ends, said extension member having at each of its edges a wall to fit between the walls of the splicing member.

4. In an adjustable metallic frame, the combination with a pair of channeled members located in alinement with one another but spaced apart at one of their ends, each of said members having on one of its walls a flange extended outwardly from said wall, a channeled splicing member embracing said alined members at their adjacent portions and having in one of its walls a channeled extension to receive the flanges on the first named members and provided with an eye extended from said channeled wall, a link loosely mounted in said eye, and an extension member located within the splicing member between the ends of the alined members.

5. In an adjustable metallic frame, the combination with a pair of channeled members located in alinement with one another but spaced apart at one of their ends, each of said members having on one of its walls a flange extended outwardly from said wall, a channeled splicing member telescopically engaging said alined members at their adjacent portions and having in one of its walls a channeled extension to receive the flanges on the first named members, and an extension member located within the splicing member between the ends of the alined members.

6. A metallic frame including in its construction an inner and an outer clamping member, said inner member consisting of a piece having at each of its edges a wall each provided with a flange extended in the same direction, said inner member also having between its walls a longitudinally extended corrugation, said outer member consisting of a piece having a longitudinally extended and inwardly disposed corrugation to impinge against the first named corrugation and provided at each of its edges with a wall to fit between the walls of said inner member, one of the members of said outer member having its free edge inturned and the other wall of said member having its edge outturned or rolled and provided with an apertured extension, a suitably supported hinge plate having an extension provided with eyes to register with the said apertured extension of the outer member, and a pintle located in said eyes and apertures.

7. A metallic frame comprising, in combination, coöperating inner and outer clamping members, the inner clamping member being provided with a wall having an outwardly projecting flange forming a bearing for a sheet of material and with a wall having an inwardly projecting flange coacting with the outer clamping member, and the outer clamping member being provided with a portion coacting with said last mentioned flange and with a wall bearing against the wall of said inner clamping member opposite to said inwardly extending flange, the said clamping members being constructed and adapted for yieldingly resistant engagement.

8. A frame strip with up-turned rims, a clamp strip rockably mounted in said frame strip intermediate its rims and provided with edges adapted to move bodily along said rims in opposite directions, said clamps being wider than the distance between the two rims.

9. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border.

10. A frame strip with up-turned rims, a clamp strip rockably mounted in said frame strip intermediate its rims and provided with edges adapted to move bodily along said rims in opposite directions, said clamp being wider than the distance between the two rims, one of said strips being of spring material.

11. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border, one of said strips being of spring material.

12. A frame strip with up-turned rims, a clamp strip rockably mounted in said frame strip intermediate its rims and provided with edges adapted to move bodily along said rims in opposite directions, said clamp being wider than the distance between the two rims, the clamp strip being of spring material.

13. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border, the clamp strip being of spring material.

14. A frame strip with up-turned rims, a clamp strip rockably mounted in said frame strip intermediate its rims and provided with edges adapted to move bodily along said rims in opposite directions, said clamp being wider than the distance between the two rims and an inward projection on the upper surface of the outer rim of the frame strip to hold the clamp strip in position.

15. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border and an inward projection on the upper surface of the outer rim of the frame strip to hold the clamp strip in position.

16. A frame strip with up-turned rims, a clamp strip rockably mounted in said frame strip intermediate its rims and provided with edges adapted to move bodily along said rims in opposite directions, said clamp being wider than the distance between the two rims, one of said strips being of spring material, and an inward projection on the upper surface of the outer rim of the frame strip to hold the clamp strip in position.

17. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border, one of said strips being of spring material, and an inward projection on the upper surface of the outer rim of the frame strip to hold the clamp strip in position.

18. A frame strip with up-turned rims, a clamp strip rockably mounted in said frame strip intermediate its rim and provided with edges adapted to move bodily along said rims in opposite directions, said clamp being wider than the distance between the two rims, the clamp strip being of spring material, and an inward projection on the upper surface of the outer rim of the frame strip to hold the clamp strip in position.

19. A frame strip with up-turned rims adapted to receive the screen border on its inner rim, a clamp strip rockably mounted in said frame strip intermediate its rims and provided with edges adapted to move bodily along said rims and one of them to engage the screen border, said clamp being wider than the distance between the screen border when in position on the rim and the opposite rim whereby the clamp when rocked on its axis will alternately clamp and free the screen border, the clamp strip being of spring material and an inward projection on the upper surface of the outer rim of the frame strip to hold the clamp strip in position.

In testimony whereof I have hereunto signed my name in the presence of the two subscribed witnesses.

CHARLES A. HENRY.

Witnesses:
MARTHA WESTMAN,
PAUL CARPENTER.

Copies of this patent may be obtained for five cents each, by addressing the "Commissioner of Patents, Washington, D. C."